(12) United States Patent
Carter et al.

(10) Patent No.: US 9,213,083 B1
(45) Date of Patent: Dec. 15, 2015

(54) HYPERBOLIC POSITIONING METHOD USING BROADCAST DIGITAL TELEVISION SIGNALS AND MONITOR RECEIVER RANGING

(71) Applicant: The United States of America as represented by the Secretary of the Navy, Washington, DC (US)

(72) Inventors: Kaylene L. Carter, San Diego, CA (US); Rohan Ramlall, Brentwood, CA (US); John McEachen, Carmel, CA (US); Murali Tummala, Monterey, CA (US)

(73) Assignee: THE UNITED STATES OF AMERICA AS REPRESENTED BY THE SECRETARY OF THE NAVY, Washington, DC (US)

( * ) Notice: Subject to any disclaimer, the term of this patent is extended or adjusted under 35 U.S.C. 154(b) by 0 days.

(21) Appl. No.: 14/477,586

(22) Filed: Sep. 4, 2014

Related U.S. Application Data (60) Provisional application No. 61/874,214, filed on Sep. 5, 2013.

(51) Int. Cl.
*H04M 1/10* (2006.01)
*G01S 5/10* (2006.01)
*H04W 4/02* (2009.01)

(52) U.S. Cl.
CPC ... *G01S 5/10* (2013.01); *H04W 4/02* (2013.01)

(58) Field of Classification Search
CPC .... H04W 36/385; H04W 64/00; H04W 84/18
USPC ........................................................ 455/456.1
See application file for complete search history.

(56) References Cited

U.S. PATENT DOCUMENTS

| | | | |
|---|---|---|---|
| 6,859,173 B2 * | 2/2005 | Spilker, Jr. | H04N 21/8126 342/463 |
| 7,126,536 B2 | 10/2006 | Rabinowitz et al. | |
| 8,233,091 B1 | 7/2012 | Rabinowitz et al. | |
| 8,339,317 B2 | 12/2012 | Camp, Jr. | |
| 8,677,440 B2 | 3/2014 | Opshaug et al. | |
| 2006/0050625 A1 * | 3/2006 | Krasner | G01S 1/04 370/208 |
| 2010/0240389 A1 * | 9/2010 | Harper | H04W 36/385 455/456.1 |
| 2012/0021764 A1 * | 1/2012 | Enright | G01S 19/10 455/456.1 |

OTHER PUBLICATIONS

M. Rabinowitz and J. Spilker, "A new positioning system using television synchronization signals," IEEE Transactions on Broadcasting, vol. 5 1, No. 1, pp. 51-61, Mar. 2005.

(Continued)

*Primary Examiner* — Don N Vo
(74) *Attorney, Agent, or Firm* — Spawar Systems Center Pacific; Kyle Eppele; Ryan J. Friedl (57) ABSTRACT

A system and method involve determining a time difference of arrival between two robust broadcast digital television (DTV) signals received at a mobile receiver and a monitor receiver from at least two DTV transmitters, determining a pseudorange between the mobile receiver and each of the DTV transmitters, and determining a position of the mobile receiver using the determined pseudoranges and the distance between the monitor receiver and the mobile receiver.

20 Claims, 7 Drawing Sheets

(56) References Cited

OTHER PUBLICATIONS

J. Do et al., "Performance of Hybrid Positioning System Combining GPS and Television Signals," 2006 IEEEIION Position, Location and Navigation Symposium, pp. 556-564, Apr. 2006.

J. Do, "Road to seamless positioning: hybrid positioning system combining GPS and television signals," Ph.D. dissertation, Dept. Elect. Eng., Stanford Univ., Stanford, CA, 2007.

* cited by examiner

HYPERBOLIC POSITIONING METHOD USING BROADCAST DIGITAL TELEVISION SIGNALS AND MONITOR RECEIVER RANGING

CROSS-REFERENCES TO RELATED APPLICATIONS

This application claims the benefit of U.S. Provisional Patent Application Ser. No. 61/874,214 filed Sep. 5, 2013, entitled "Hyperbolic Localization in a GPS-Denied Environment Using Broadcast Digital Television Signals", the content of which is fully incorporated by reference herein.

FEDERALLY SPONSORED RESEARCH AND DEVELOPMENT

The Hyperbolic Positioning Method Using Broadcast Digital Television Signals and Monitor Receiver Ranging is assigned to the United States Government. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil. Reference Navy Case No. 102711.

BACKGROUND

Recent work has focused on using broadcast digital television (DTV) signals to help determine the position of a mobile user. In some areas however, DTV transmitters are sparsely located. Accordingly, a need exists for a system and method to accurately determine the position of a mobile user when a minimal number of DTV transmitters are present.

DETAILED DESCRIPTION OF SOME EMBODIMENTS

Reference in the specification to "one embodiment" or to "an embodiment" means that a particular element, feature, structure, or characteristic described in connection with the embodiments is included in at least one embodiment. The appearances of the phrases "in one embodiment", "in some embodiments", and "in other embodiments" in various places in the specification are not necessarily all referring to the same embodiment or the same set of embodiments.

Unless specifically stated otherwise, discussion herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of the "a" or "an" are employed to describe elements and components of the embodiments herein. This is done merely for convenience and to give a general sense of the invention. This detailed description should be read to include one or at least one and the singular also includes the plural unless it is obviously meant otherwise.

The embodiments of the system and method disclosed herein use DTV signals to produce two-dimensional positioning solutions. DTV is a promising and complementary candidate for position localization due to several advantages inherent in the system design. DTV employs 8-level vestigial sideband modulated signals in the very high frequency (VHF) and ultra-high frequency (UHF) bands, specifically 54-216 MHz and 470-806 MHz, respectively, in North America. DTV signals exhibit high signal strength on the order of −44 dBm. Since the DTV signals operate at much lower frequencies than GPS, they are able to penetrate buildings and dense urban environments easily. The DTV signal range is 100 km, making propagation distance nearly 200 times less than GPS. The DTV transmitter locations are fixed, unlike GPS satellites, and their numbers are sufficient in the dense urban environments where GPS suffers.

DTV signals are nearly 40 dB stronger than those of GPS, travel considerably less distance, and are emitted from stationary transmitters. DTV transmitters are a passive system, broadcasting signals which require no feedback from the end user. With multiple transmitters in a local region it is possible to use these signals to estimate a user position.

North America's Advanced Television Systems Committee (ATSC) standard specifies a repeating synchronization segment which may be exploited for positioning. Essentially, these elements serve as reference points to determine signal transit time. While not limited thereto, the embodiments of the system and method disclosed herein are discussed with reference to the North American DTV standard. The methodology discussed herein may be applied using other DTV signals that include a repeating synchronization segment, provided the appropriate modifications are performed. Such modifications may be apparent to a person having ordinary skill in the art.

DTV signals are emitted from transmitters that are not synchronized. Because the accurately-timed reception of multiple signals is desired for a position solution, either multiple transmitters or multiple receivers should be precisely synchronized. Consequently, some feature of the DTV signal that can be exploited to relay transit time information must be selected. Additionally, robust numerical algorithms for processing of the collected information to obtain accurate position estimates must be chosen. Accordingly, some embodiments of the system and method discussed herein involve the use of a secondary "monitor" receiver that is synchronized with the mobile receiver so that each collects a DTV signal from the same transmitting transmitter at the same time.

By cross-correlating each received signal against a known recurring pseudorandom (PN) sequence, relative transit time information can be determined. This timing information is then used to estimate the mobile receiver's range to the DTV transmitter. Performing these collections using two different DTV transmitters, along with obtaining a range estimate from the monitor receiver, provides enough ranging information to produce a position estimate for the mobile receiver. The locations of the DTV transmitters from which signals are collected, along with the user's estimated ranges to them, are then used, for example, in a time-difference-of-arrival (TDOA) based least squares algorithm to calculate a position estimate.

Figure 1:
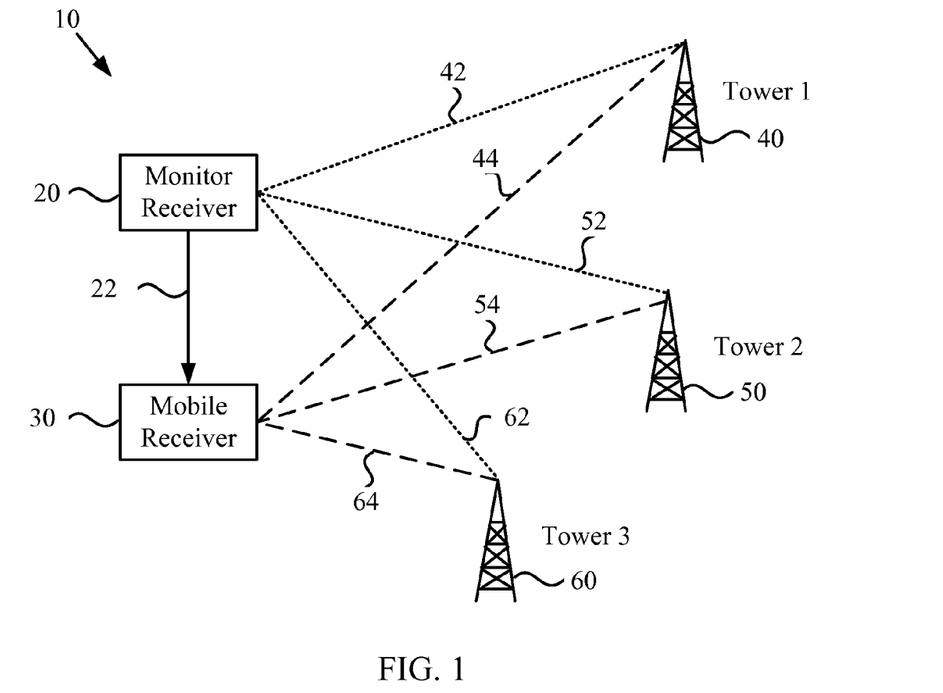
FIG. 1 shows a diagram illustrating the use of three DTV transmitters and a monitor receiver to determine the location of a mobile receiver.

FIG. 1 shows a diagram 10 illustrating the use of three DTV transmitters to determine the location of a mobile receiver. A monitor receiver 20 and a mobile receiver 30 receive signals broadcast from transmitters 40, 50, and 60. Particularly, monitor receiver 20 receives signals 42, 52, and 62, while mobile receiver 30 receives signals 44, 54, and 64. As used herein, the term "mobile receiver" is used to describe the object for which the position is being obtained, while the term "monitor receiver" is used to describe a stationary receiver whose position is known by the mobile receiver. The mobile receiver and monitor receiver are equipped to receive the broadcast signal transmitted by the DTV transmitters. As a non-limiting example, the mobile receiver is a smartphone, tablet, or other personal handheld device. In some embodiments, monitor receiver 20 is a transceiver and is configured to transmit a signal 22 to mobile receiver 30. Signal 22 includes information such as a timestamp containing the time when signal 22 is transmitted from monitor receiver 20 and data that mobile receiver 30 can use to timestamp the arrival of signal 22. As a non-limiting example, the data can be a PN sequence or cyclic prefix.

Figure 2:
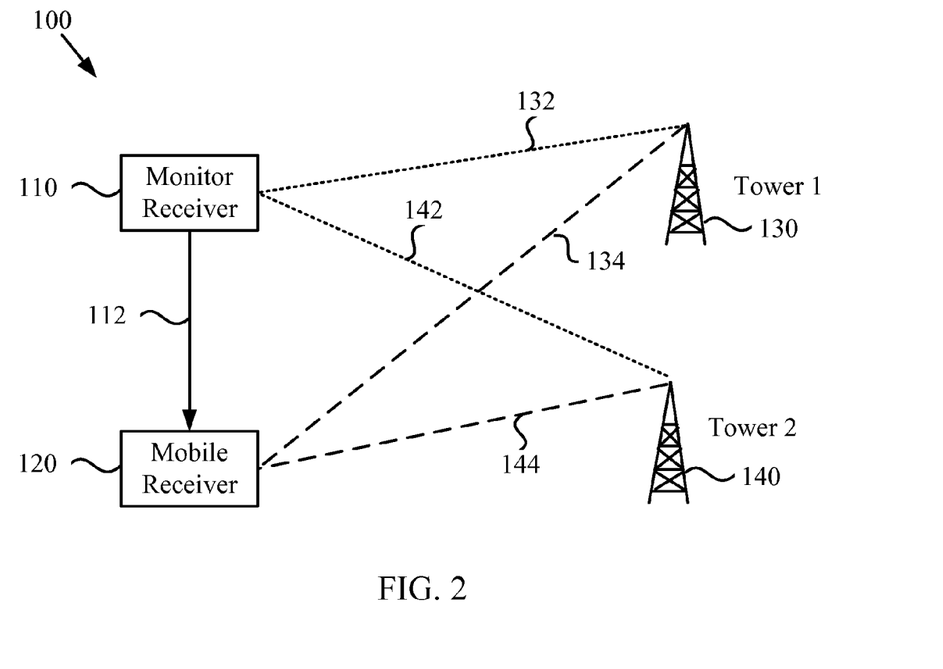
FIG. 2 shows a diagram illustrating the use of two DTV transmitters and a monitor receiver to determine the location of a mobile receiver.

Standard positioning concepts state that an unambiguous position estimate is not possible with only two reference sources. Yet, since DTV positioning requires use of a monitor station, it can replace a third TV transmitter as a ranging reference. FIG. 2 shows a diagram 100 illustrating the use of only two DTV receivers and a monitor receiver to determine the location of a mobile receiver. A monitor receiver 110 and a mobile receiver 120 receive signals broadcast from transmitters 130 and 140. Particularly, monitor receiver 110 receives signals 132 and 142, while mobile receiver 120 receives signals 134 and 144. In some embodiments, monitor receiver 110 is a transceiver and is configured to transmit a signal 112 to mobile receiver 120. Signal 112 includes information such as a timestamp containing the time when signal 112 is transmitted from monitor receiver 110 and data that mobile receiver 120 can use to timestamp the arrival of signal 112. As a non-limiting example, the data can be a PN sequence or cyclic prefix.

In a three transmitter environment, such as shown in FIG. 1, if one of the transmitters is producing erratic measurements (which may be indicated by large variance), it may be beneficial to replace that transmitter's pseudorange with the monitor's range.

Hyperbolic positioning, also known as TDOA, is a method used for formulating a position fix based on the difference in arrival time of signals emanating from two different synchronized transmitting stations. It is different from trilateration, also known as time-of-arrival (TOA) techniques, in that it takes the difference between two signal arrival times, rather than the two discrete signal transit times. The TOA approach uses signal arrival times from three or more different sources to determine the ranges to each source. The three ranges create three range circles around each source; the intersection common to all three circles is the resulting position estimate.

On the other hand, TDOA uses three stations to create two values (differences) that can form a position estimate and uses hyperbolic lines rather than circles. If a transmitting station B is further from an observer than another station A, then a transmitted pulse from B arrives later than A's if both stations transmitted simultaneously. TDOA measurements are made from pairs of sources; the time difference measured between the two signals is equivalent to the difference between the distances traveled by the signals. This difference forms one hyperbolic line-of-position (LOP), where the foci of the hyperbola are the two stations. Somewhere on this line is the observer's position. Measurements from a second pair of transmitters forms a second hyperbolic LOP. Where these two LOPs intersect is the final position estimate.

Figure 3:
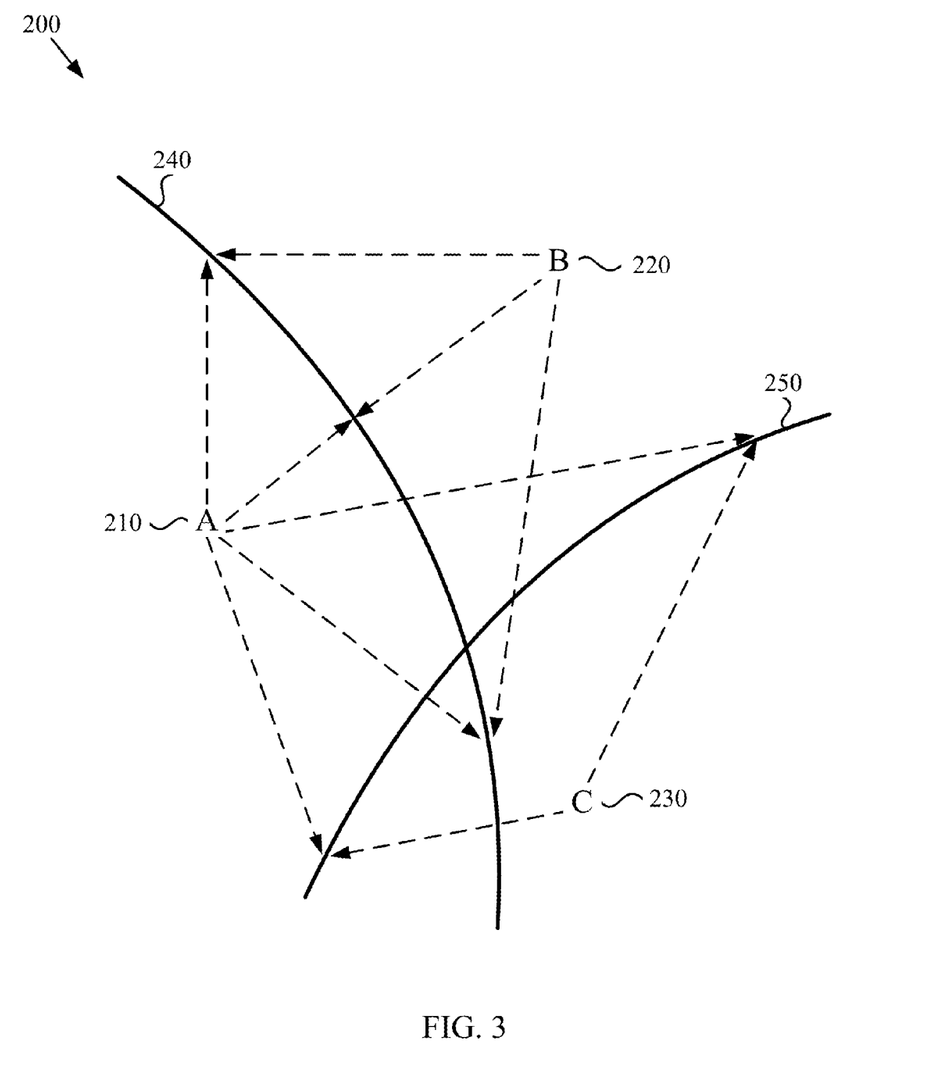
FIG. 3 shows a diagram illustrating time difference of arrival position estimate results from the intersection of two hyperbolas determined from the difference in range to two DTV transmitters.

An example of TDOA is seen in diagram 200 shown in FIG. 3. The transmitting stations are A 210, B 220, and C 230. Suppose that the observer received station A 210's signal before that of B 220. From the difference in signal arrival times, the observer determines that the difference in range from A 210 and B 220 is 10 km. This narrows the observer's location to somewhere on hyperbola 240, which is formed from the possible range combinations that meet the difference criterion. The dashed lines pointing to hyperbola 240 represent three possible range combinations. The resulting hyperbola will always be slightly concave towards the closer of the two stations. Another hyperbola 250 is formed using a different transmitter pair, stations A 210 and C 230. Since the observer is located at one point on each hyperbola, the point of intersection of hyperbolas 240 and 250 is the observer's position.

The two-dimensional (2-D) TDOA localization requires two pairs of transmitting stations, thus, at least three reference sources. The TDOA approach may be used equivalently to locate an emitter by using the difference in signal arrival times at two receivers. Two TOA measurements can be transformed into one TDOA measurement after differencing, which is the technique used in some embodiments of the method described herein.

The ATSC signals broadcast from all North American DTV transmitters are 8-level vestigial sideband (8-VSB) modulated, with the lower sideband suppressed. With 6 MHz channel bandwidth and nearly 500 MHz total DTV bandwidth, there are 68 digital channels available. The data are trellis encoded with three bits per symbol to accommodate the eight levels and have a symbol rate of 10.76 MHz.

Figure 4:
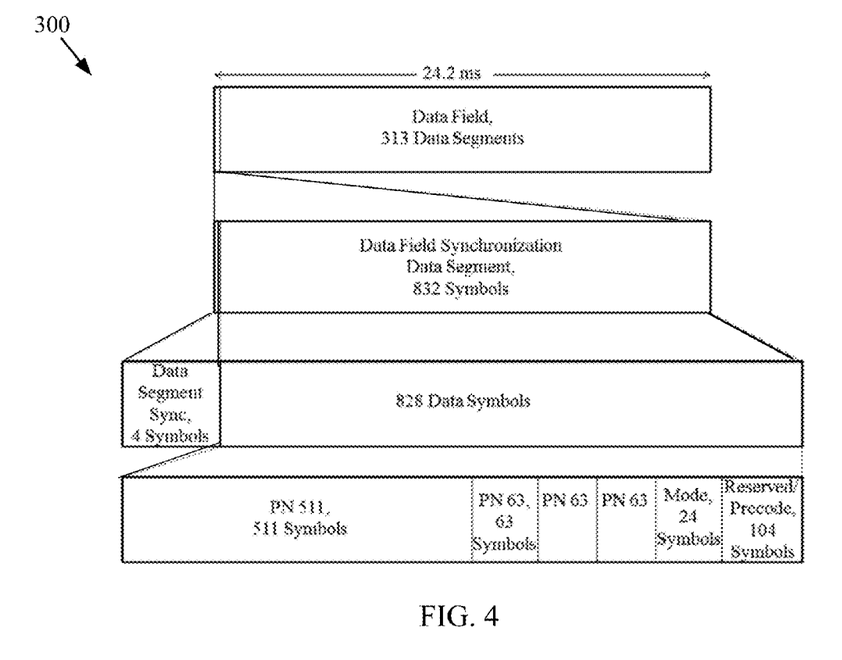
FIG. 4 shows a diagram illustrating the structure of an ATSC DTV data field.

The DTV signal is formatted into frames, which are further divided into fields, segments and symbols. The data field structure breakdown is shown in diagram 300 of FIG. 4. Two fields comprise a data frame, each field having duration of 24.2 ms. Each field contains 313 data segments, where the first segment is called a field synchronization data segment, and the remaining 312 segments contain the payload audio and video information. This field synchronization data segment holds a unique synchronizing signal that contains the training signal for the receiver equalizer. The pertinent part of the data field for the purposes discussed herein is this field synchronization data segment.

Each data segment contains 832 symbols, and the first segment is termed the data field synchronization data segment. The first four symbols are the data segment synchronization, followed by a series of pseudo-random noise (PN) sequences. These PN sequences are formed by a sequence generator and are used to relay information on the quality of the channel. The data field synchronization segment contains a 511-symbol PN sequence followed by three repetitions of a 63-symbol PN sequence. The string of bits comprising each PN sequence is detailed in the ATSC standard. The next portion of the data field synchronization segment contains 24 symbols and specifies the VSB mode used. The last portion of the segment is 104 symbols, of which 94 are reserved for future standard use, and the last 12 symbols are a precode corresponding to the last 12 symbols of the previous segment. For the method described herein, the pertinent part of the field synchronization segment is the PN 511 sequence, which may be cross-correlated against a received signal to extract timing, and thus ranging, information.

There are many kinds of receivers that may be used as the monitor receiver or mobile receiver to acquire DTV signals. One example is a software-defined radio (SDR). One of the most flexible, inexpensive SDRs for this purpose is the Universal Software Radio Peripheral (USRP) by Ettius Research™. The USRP is a small platform that enables typical computers to perform normal SDR functions (i.e., filtering, modulating, demodulating, etc.) without the bulky equipment. Along with its software counterpart, GNU Radio, the USRP can sample DTV signals and store the data for processing.

The USRP is a device which allows general purpose computers to function as high bandwidth software radios. These radios are operated by the host machine, which it is connected to via a Gigabit Ethernet link. The USRP motherboard is comprised of basic components: a field-programmable gate array, digital-to-analog converter, analog-to-digital converter, clock, power regulator and processor interface. Daughterboards may then be installed which behave as RF front-ends to allow a wide array of analog operations. Current models of the networked USRP can operate from DC to 6 GHz and have the potential to process 100 million samples per second (Msps) in both transmit and receive directions. Its clock rate of 100 MHz allows for synchronization to 10 ns.

Upon receiving a radio signal, the USRP collects in-phase and quadrature (I/Q) data quantized to 14 bits. Though the USRP can process 100 Msps, due to the Ethernet link, the actual receive sampling rate is limited to 25 Msps. Once data files are stored, they may be processed by other applications on the host machine. One of the enhanced functions that can be performed by the USRP is its ability to sample two TV channels simultaneously. The daughterboard, supporting 2 channels, having a bandwidth of between 1.7-10 MHz, and a noise figure between 4-10 dB, enables the USRP to sample frequencies in the DTV range, 50-860 MHz.

The USRP may be operated by the GNU Radio software suite, which was specifically developed for software-defined radio systems. GNU Radio is an open-source program that may be used in conjunction with the USRP to create complex radio systems. The GNU Radio program consists of signal processing blocks written in C++ and Python, which are arranged by the user to emulate a system of interest.

Figure 5:
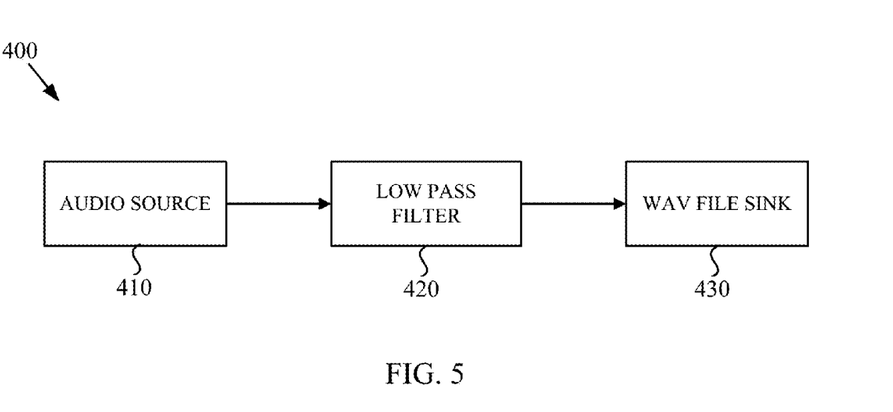
FIG. 5 shows a block diagram illustrating an example of signal processing blocks for a GNU radio.

GNU Radio Companion (GRC) is a GNU Radio graphical user interface that allows the user to create flowgraphs. These flowgraphs are comprised of a series of interconnected functional blocks, where each block performs a specific task. There are a variety of predefined blocks: data sink, filters, modulators and transforms to name a few. An example of signal processing blocks for filtering an audio signal is shown FIG. 5. FIG. 5 shows a processing system 400 comprising audio source 410, low pass filter 420, and way sink file 430, which are connected via their input/output ports. Audio source block 410 represents the incoming signal and has a specified sampling rate of 32,000 samples per second. The collected samples are sent through low pass filter 420, and the output is saved in a way file, represented by the way file sink block 430. Once the DTV data is collected, processing occurs to determine a final position estimate.

Figure 6:
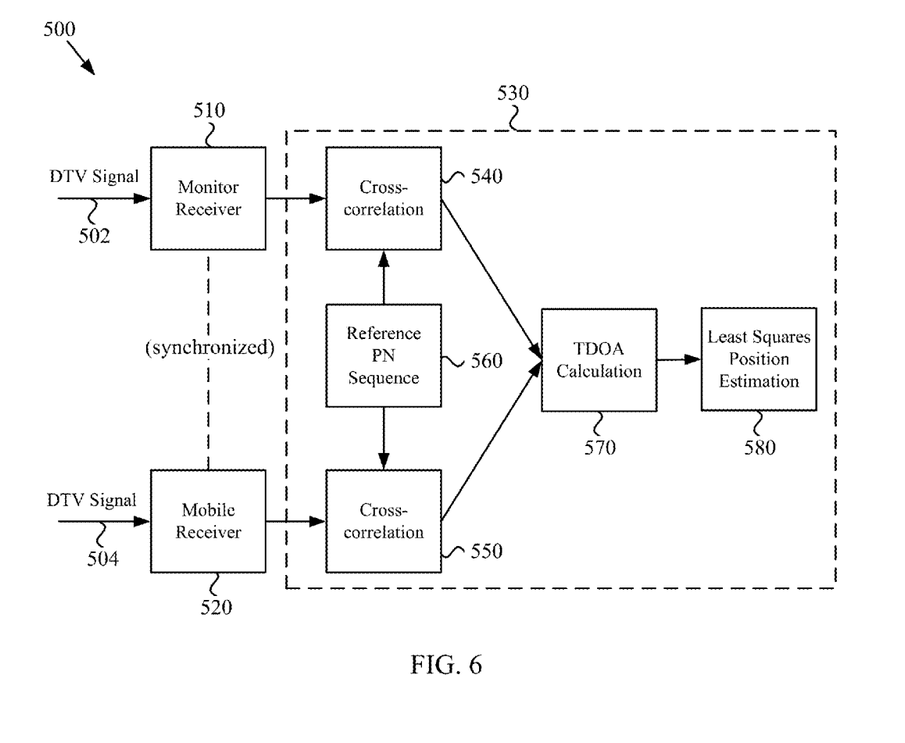
FIG. 6 shows a block diagram of an embodiment of a system configured to perform the Hyperbolic Positioning Method Using Broadcast Digital Television Signals and Monitor Receiver Ranging.

FIG. 6 shows a block diagram of an embodiment of a system 500 configured to perform the steps in the proposed method. System 500 includes a monitor receiver 510 and a mobile receiver 520 each configured to receive a broadcast DTV signal, signals 502 and 504 respectively, from at least two DTV transmitters, such as transmitters 40, 50, and 60 shown in FIG. 1 and transmitters 130 and 140 shown in FIG. 2. Monitor receiver 510 and mobile receiver 520 are communicably connected. The communication link between monitor receiver 510 and mobile receiver 520 may be wired or wireless.

System 500 further includes a processing system 530 communicably connected, via a wired or wireless connection, to each of monitor receiver 510 and mobile receiver 520. As an example, processing system 530 may be implemented in an application-specific integrated circuit (ASIC). Processing system 530 may also, for example, be a computer containing the appropriate software modules installed therein to perform some or all of the steps of method 900 discussed herein with reference to FIG. 10.

As used herein, the term "module generally refers to a software module. A module may be implemented as a collection of routines and data structures that performs particular tasks or implements a particular abstract data type. Modules generally are composed of two parts. First, a software module may list the constants, data types, variables, and routines that may be accessed by other modules or routines. Second, a module may be configured as an implementation, which may be private (i.e., accessible only to the module), and which contains the source code that actually implements the routines or subroutines upon which the module is based. Thus, the use of the term "module" herein, indicates reference to such software modules or implementations thereof. The terms "module" and "software module" can be utilized interchangeably with one another to describe the same element or feature.

The embodiments described herein may be implemented as a series of modules, either functioning alone or in concert with physical electronic and computer hardware devices. Such modules may be utilized separately and/or together locally and/or remotely to form a program product thereof, that may be implemented through signal-bearing media, including transmission media and recordable media. The methods described herein may be implemented as a program product comprised of a plurality of such modules, which can be interactively displayed for a user on a display screen of a data-processing system (e.g., computer). Such interactivity may be provided by a specialized graphical user interface (not shown).

Accordingly, processing system 530 is configured to determine a time difference of arrival (TDOA) between the DTV signals received at mobile receiver 520 and monitor receiver 510, determine a pseudorange between mobile receiver 520 and each of the DTV transmitters, and determine a position of mobile receiver 520 using the determined pseudoranges and the distance between monitor receiver 510 and mobile receiver 520. The components within processing system 530 that are configured to achieve such steps include cross-correlation components 540 and 550, TDOA calculation component 570, and least squares position estimation component 580.

Cross-correlation component 540 performs cross-correlation of DTV signal 502 received by monitor receiver 510 against reference PN sequence 560. Cross-correlation component 550 performs cross-correlation of DTV signal 504 received by mobile receiver 520 against reference PN sequence 560. As an example, cross-correlation components 540 and 550 are configured to determine the location of the peak occurrence in the first 24.2 ms field duration. If a peak is not observed in the first 24.2 ms, then the second 24.2 ms field is observed. If a peak is not obtained in either of these observations, then that particular data set is not averaged in to determine the value for that particular frequency.

In some embodiments, the signal propagation delays through the system hardware components is then measured and accounted for. Then, the values for each pair of collected data sets are calculated. These values are then converted to distance for each data set and averaged to yield one distance per DTV channel.

In some embodiments, DTV signals may be collected from multiple transmitters at the same area. In such embodiments, the best performing transmitter from each location may be used to represent that source location. The "best" channel to use may be determined by comparing the measured value to the approximated 3-D signal propagation distance between the monitor and mobile stations. In another embodiment, the monitor receiver and the mobile receiver are not at the same altitude. For example, the monitor receiver is on the roof of a building and the mobile receiver is below, inside of the building. In this scenario, the monitor may receive all the transmitted signals from the area, but the mobile only receives one of them. In this case, the monitor receiver may broadcast all of its TOA measurements and the mobile may decide which one it uses based on the strength of the correlation peak.

In another embodiment, the monitor may broadcast all the TOA measurements and the mobile may decide which ones to use based on which signals are robust. As used herein, a "robust signal" is a DTV signal that produces repeating peaks occurring every 24.2 ms when cross-correlated against the ATSC PN 511 sequence.

The approximation of the true 3-D signal propagation distance is a two-step process. The first step is calculating the true monitor-transmitter 3-D range, using latitude and longitude values with the Vincenty formula and the Pythagorean theorem. The true 2-D monitor-transmitter range and the altitude difference between monitor and mobile are used to determine this value. In the same manner, the 3-D mobile-transmitter signal propagation distance is then calculated. Then, the 3-D monitor-transmitter range is subtracted from the 3D mobile-transmitter range. The result is the estimated distance between the monitor and mobile receivers.

The difference between this value and the average measured is the pseudorange error. This metric determines which channels are used in the positioning algorithm; the channels with the least amount of pseudorange error from each of the three transmitter areas are chosen to represent that area. Equation 8 is then used with the measured values to form the pseudoranges.

After the mobile-transmitter pseudoranges have been determined, their respective transmitters are assigned numbers, 1, 2, or 3 for example. Of the channels settled on, the channel whose transmitter provided the least pseudorange error is transmitter 1, and the transmitter whose channel provided the most pseudorange error is transmitter 3. The remaining transmitter is numbered transmitter 2. The TDOA values may then be calculated by TDOA calculation component 570 using Equation 10 where j takes on values 2 and 3. In some embodiments however, other positioning techniques than TDOA may be used, including techniques such as received signal strength (RSS), frequency difference-of-arrival (FDOA), and angle-of-arrival (AOA). The last step is for least squares position estimation component 570 to implement the least squares algorithm to calculate mobile receiver position.

By way of example, one embodiment of a system for performing the embodiments of the method disclosed herein involves use of one USRP N210 software-defined radio with TVRX2 daughterboard, one laptop, two TV antennas, one Trimble Thunderbolt E GPS disciplined clock, GPS antennas, amplifiers, preamplifiers, and coaxial cables. Each TV antenna represented either the monitor or mobile receiving station. Instead of using two TV antennas connected to two USRP radios, each antenna was connected to one USRP. With the TVRX2 daughterboard installed, the USRP N210 was capable of receiving two DTV signals simultaneously. The monitor DTV antenna was connected via RG-6 coaxial cable to the RF1 input port of the USRP, and similarly, the mobile DTV antenna was connected to the RF2 input port of the USRP.

To attain a position estimate using broadcast DTV signals, the locations of the transmitting sources and the ranges from the mobile user to each transmitting source are needed. The DTV transmitter latitude, longitude and altitude values may be obtained from the FCC database. The altitude values may be used to obtain accurate 3-D monitor-transmitter and mobile-transmitter distances, which may be used to determine which DTV transmitters can be used in the positioning methodology. In a real-time DTV positioning application, the latitude, longitude, and altitude values may be stored at the receiver for immediate use. Once the transmitter locations are obtained, the next task is to determine the ranges from the mobile user to each DTV transmitter.

For most TDOA positioning systems only one receiver is required, provided that the transmitters are synchronized. However, since the DTV system was not designed to be a positioning tool, the transmitting transmitters are asynchronous. Thus, to gauge the mobile receiver's relative distance from a TV transmitter, an additional receiver is necessary, for a total of two receivers. This additional receiver is termed the reference or "monitor" receiver. In some embodiments, the monitor receiver is synchronized with the mobile receiver. The monitor receiver is typically placed in a separate location from the mobile receiver and is at a fixed location that is known to the mobile receiver. Like the transmitting transmitters, the monitor receiver is treated as a reference in the disclosed system and method.

The monitor receiver's role is as a reference upon which the mobile receiver makes relative distance calculations. If the monitor receiver receives a portion of a signal from a DTV transmitter at time $t_R$ and the mobile receiver receives that same portion at time $t_M$, then the time difference between them, $$\Delta t = t_M - t_R \qquad (\text{Eq. 1})$$

indicates the difference in signal arrival time between the two receivers and may be referred to as the "time-difference-of-arrival" between the two signals. Essentially, it indicates how much later the signal arrived at the mobile than at the monitor, which is a valuable piece of information.

Figure 7:
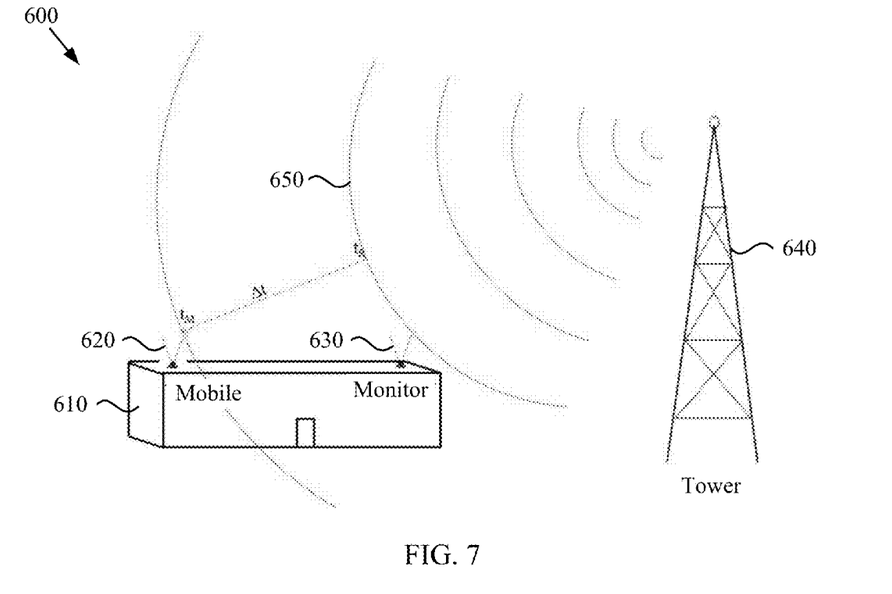
FIG. 7 shows a diagram illustrating the relationship between the mobile receiver, monitor receiver, and a DTV transmitter to determine the mobile receiver's distance from the DTV transmitter.

A visual representation of $\Delta t$ is shown in diagram 600 of FIG. 7. Referring to FIG. 7, on top of a building 610 rests the mobile receiver 620 and the monitor receiver 630. Building 610 is located a distance from transmitter 640, which transmits a signal 650 that is received at $t_M$ by mobile receiver 620 and at $t_R$ by monitor receiver 630. The $\Delta t$ can then be translated to distance to determine how much closer/farther the mobile is to the DTV transmitter than the monitor receiver. This relative distance can be obtained using the receivers' collected signal data. By adding this distance to the known distance between the monitor receiver and transmitter, the mobile receiver determines its estimated range to the source DTV transmitter. These range estimates are computed to each transmitter used in the positioning determination.

In the three-transmitter scenario depicted in FIG. 1, each transmitter 40, 50, and 60 transmits a broadcast signal collected by monitor receiver 20 and mobile receiver 30, resulting in one pertaining to each transmitter. The three $\Delta t$ values are then used to form three range estimates that may be used in determining a position estimate for mobile receiver 30.

Figure 8:
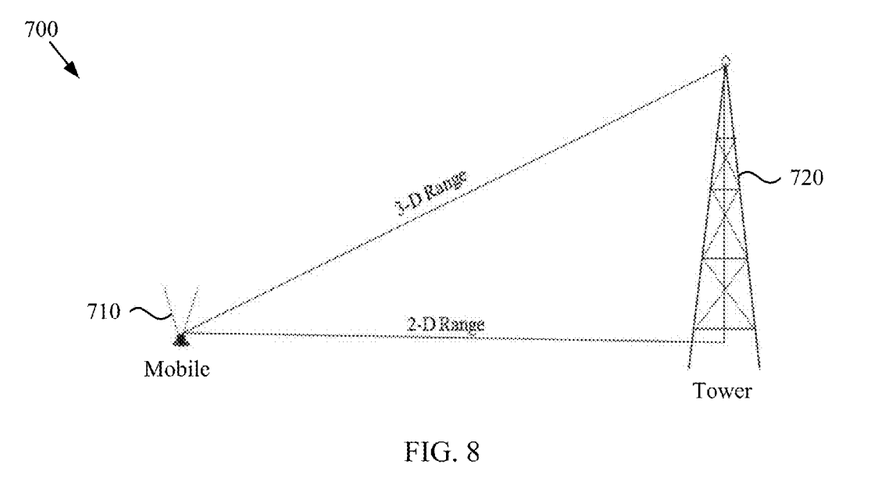
FIG. 8 shows a diagram illustrating the distinction between 3-D and 2-D range terminology.

When referring to distance dimensions, three-dimensional (3-D) denotes the true propagation path distance between the TV transmitter and the receiver. This distance is shown in diagram 700 of FIG. 8 with respect to mobile receiver 710 and DTV transmitter 720. The 2-D range refers to the projection of the 3-D range onto the Earth's surface; it is the shortest path distance between the base of the mobile receiver 710 and the base of DTV transmitter 720.

The term "monitor-transmitter" range refers to the 2-D distance between the monitor receiver and DTV transmitter, and likewise the term "mobile-transmitter" range refers to the 2-D distance between the mobile receiver and the DTV transmitter. Having been derived from a time measurement, "pseudorange" is designated as another name for a mobile-transmitter range estimate, meant to be an approximation of the true mobile-transmitter range. The term "pseudorange" only applies to the mobile receiver, as the monitor-transmitter ranges are known values.

A DTV "channel" is the 6-MHz frequency bandwidth allotted to one TV signal. A transmitter or TV "frequency" refers to the center frequency of the 6 MHz channel. "Transmitter" and "tower" may be used interchangeably since they refer to the physical location of the DTV transmitter, located atop a tower. Since multiple TV transmitters often reside on the same hill/mountain, an "area" refers to this small region where multiple TV transmitters are situated. Additionally, when the TV signal data are collected by the receivers, they are saved into data files. A data "set" refers to one collected data file.

In some embodiments, the monitor receiver and the mobile receiver are synchronized. Accordingly, each station collects simultaneously from the same DTV transmitter for the same duration. The synchronization of both stations helps achieve an accurate mobile-transmitter pseudorange. For example, if the mobile is stationed 100 meters farther from the TV transmitter than the monitor station, that is equivalent to a radio frequency propagation time of 334 ns. If the two stations have zero synchronization error and are operating under free space conditions, then a portion of the data collected at the monitor will also appear in the mobile's collected data, but 334 ns later. If the two stations are not synchronized precisely, this can contribute to several meters of positioning error.

Synchronization between two receiving stations at different locations will yield common data between the two sets with a time lag. This time delay exposes the difference in propagation times, which is critical information made more dependable by precise synchronization at collection time.

If the local environment has only two TV transmitters available as positioning sources, DTV positioning may still be performed. In 2-D positioning, three reference sources are required. In this situation, the requisite monitor station can be treated as the third reference. As previously described, the two transmitters will produce two pseudoranges. The distance between the monitor and mobile is then the third range necessary for localization.

In a real-world application, the mobile receiver's distance from the monitor receiver is unknown. If a communications link exists between the two receivers, round-trip times (RTT) may be one way to obtain the distance between them. Another method would be for the monitor to broadcast a timing beacon. Upon its reception by the mobile, signal transit time and, thus, distance from the monitor, could be determined. If the monitor-mobile communication link provides a precise range between them, this two-transmitter scheme has potential to outperform the three-transmitter scheme. This is because of the quality of the three ranges used; the two-transmitter method could guarantee one range with a high degree of accuracy. The three-transmitter scheme relies purely on the DTV signals, which are passive signals and cannot guarantee even one precise pseudorange.

Figure 9:
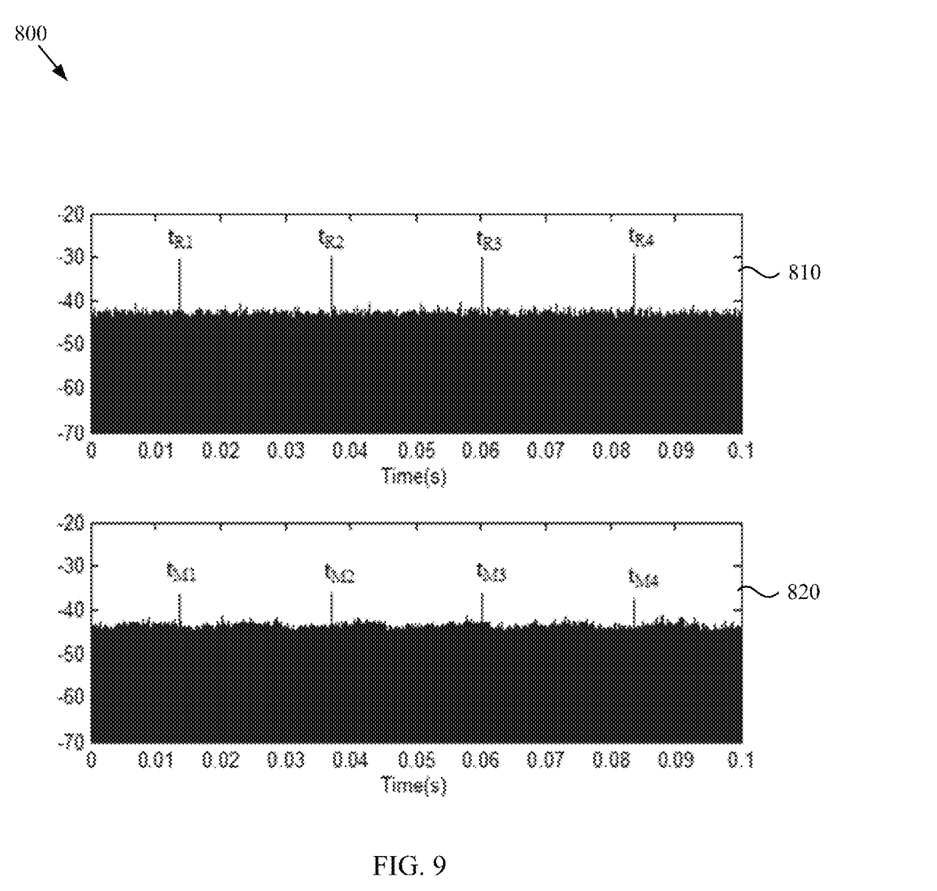
FIG. 9 shows graphs illustrating the cross-correlation between the known PN sequence and 100 ms of received DTV signals at the monitor receiver and mobile receiver.

Once the monitor receiver and mobile receiver have collected the DTV data sets, data processing can begin. First, the collected data from each station are cross-correlated against the ATSC PN-511 sequence. Cross-correlation is performed by $$r_{s,r}[l] = \sum_{t=-\infty}^{\infty} s[t] r[t-l], \, l = 0, \pm 1, \pm 2, \ldots \qquad (\text{Eq. 2})$$

where s [t] is the received DTV data set, r [t] is the PN-511 sequence, and l is the time lag indicating the time shift between s and r. A plot of the cross-correlation sequence shows peaks where the PN sequence is found within the data set. As the PN sequence recurs every 24.2 ms in the broadcast signal, the resulting cross-correlation peaks occur every 24.2 ms as well. Samples of collected DTV signals at both receive stations have been cross-correlated against the PN sequence and are shown in graph 800 of FIG. 9, with four clearly defined peaks in both plots 810 (monitor receiver) and 820 (mobile receiver).

This peak information is used to determine the TDOA Δt. Let $t_{Ri}$ be the time values at which the peaks occur for the signals received at the monitor receiver and $t_{Mi}$ be the time values at which the peaks occur for the signals received at the mobile receiver. The time values chosen are computed by dividing the sample number of the peak's occurrence by the sampling rate. Therefore, $t_{R1}$ and $t_{M1}$ represent the time it took, from the start of signal collection, to receive the first PN sequence at the monitor and the mobile, respectively. Equation 1 is then used to measure the difference between these times, which produces $\Delta t = t_{Mi} - t_{Ri}$. Of the multiple peaks present on both data sets, any of the two related peaks may be compared, but the first peaks $t_{R1}$ and $t_{M1}$ are preferred in case of receiver clock drift. This value may take on a positive or negative sign, indicating which station is closer to the transmitter.

Since the TV antennas at the monitor and mobile stations receive the TV signal and then pass it to the respective USRP through a series of equipment and components, this additional propagation delay must be accounted for. Once the signal is received at the USRP, it is passed to the host computer, which stores the data in .dat files. Therefore, the signal arrival time appears to be later than the true time it was collected at the station TV antenna. To account for this lag, any equipment delay time must be measured and subtracted from the observed arrival time to produce the correct arrival time. This requires a slight adjustment to the calculation $t_{Ri}$ and $t_{Mi}$ as given by $$t_{Ri} = t_{Ri} - \delta_1 \quad \text{(Eq. 3)}$$

$$t_{Mi} = t_{Mi} - \delta_2 \quad \text{(Eq. 4)}$$

where $\delta_1$ represents any equipment delay time from the monitor DTV antenna to the USRP, and $\delta_2$ represents equipment delay time from the mobile DTV antenna to the USRP. If the same amount of connecting equipment is present on both the monitor and mobile ends, then this propagation adjustment need not be made. This adjustment ensures that the calculation of Δt is as accurate as possible.

The TDOA Δt is the one piece of information extracted from each pair of simultaneously collected data sets. In an embodiment, if the monitor and mobile stations each collect one data set from one TV frequency five times, there are five Δt values to compute and then average. This averaged value is referred to as $\Delta t_i$ for each DTV transmitter collected from, where i corresponds to the transmitter number that transmitted the signal, ranging from 1 to M number of transmitters being used. In another embodiment, if the monitor and mobile stations each collect one data set from one TV frequency five times, there are five Δt values to compute and no averaging is done, enabling higher position estimate update rates.

The unknown mobile-transmitter ranges may be calculated from the standard Euclidean distance formula $$d_i(x,y) = \sqrt{(x-x_i)^2 + (y-y_i)^2}, i=1,2,3,\ldots M \quad \text{(Eq. 5)}$$

where the mobile's position is (x, y) and the known transmitter locations are $(x_i, y_i)$. Similarly, the true known monitor-transmitter ranges are $$d_{r,i} = \sqrt{(x_r-x_i)^2 + (y_r-y_i)^2}, i=1,2,3,\ldots M \quad \text{(Eq. 6)}$$

where $(x_r, y_r)$ is the reference monitor's location. Alternatively, the monitor-transmitter ranges may be calculated without first converting to XY coordinates by using their latitude and longitude values with the Vincenty formula. This formula is based on the assumption that the Earth is an ellipsoid.

The measured values $\Delta t_i$ are next converted to distance in meters using $$\Delta d_i = c \Delta t_i \quad \text{(Eq. 7)}$$

where c is the speed of light, 299,792,458 meters per second. These distance values are then used to approximate pseudo-ranges to each transmitter $$d_i = d_{r,i} + \Delta d_i, i=1,2,3,\ldots M \quad \text{(Eq. 8)}$$

Using M transmitters, we determine M values with Equation 8, which are set equal to their respective formulas of Equation 5, which results in Equation 9.

$$\sqrt{(x-x_i)^2 + (y-y_i)^2} = \sqrt{(x_r-x_i)^2 + (y_r-y_i)^2} + c\Delta t_i, i=1,2,\ldots M \quad \text{(Eq. 9)}$$

The distance between the monitor receiver and mobile receiver given by Equation 10

$$D = \sqrt{(x_R-x)^2 + (y_R-y)^2} \quad \text{(EQ. 10)}$$

where. Equations 9 and 10 are formed to solve for two unknown variables, leaving a system of nonlinear equations to solve, whose solution is the estimated mobile position (x, y).

The next step is to use a numerical algorithm for position computation. A numerical algorithm based on a Taylor-series least squares method is used to estimate the mobile's position. The algorithm uses the reference locations and pseudoranges for this purpose. This step is represented by the TDOA calculation component 570 shown in FIG. 6.

A hyperbola can be formed using the difference in ranges to two reference points. Because we have computed three mobile-transmitter pseudoranges in Equation 8, they are now used to form two hyperbolic lines like the ones in FIG. 2. Referring to Equation 5, the hyperbolas are defined by the difference between ranges to two transmitters $$d_{1j}(x,y) = d_1(x,y) - d_j(x,y)$$

$$= \sqrt{(x-x_1)^2 + (y-y_1)^2} - \sqrt{(x-x_j)^2 + (y-y_j)^2}, j=2,3,\ldots M \quad \text{(Eq. 11)}$$

where $d_i$ is the pseudorange to the first TV transmitter, and $d_j$ is the pseudorange to the jth TV transmitter. Thus, three TV transmitters provide two hyperbolas, defined by $d_{12}$ and $d_{13}$. These two range differences are then used in the least squares algorithm to derive the intersection point of the hyperbolas, which is the final position estimate.

The set of equations formed from Equations 10 and 11 are now solved with the help of a numerical algorithm. The formulas require plane geometry, so the latitude and longitude values of the monitor and TV transmitters must be converted to the XY coordinate system, which can be done with coordinate transform software.

The major obstacle in solving this system of equations is the fact that they are non-linear, yet they can be solved using an iterative Taylor-series least squares algorithm. The solution is approached through a series of position estimates, getting closer to the final solution with each iteration. This approach provides one solution so long as the number of measurements is greater than the number of unknown parameters, which is always the case when using three or more reference sources.

Define matrix A as $$A = \begin{bmatrix} \frac{(\hat{x}-x_2)}{d_2} - \frac{(\hat{x}-x_1)}{d_1} & \frac{(\hat{y}-y_2)}{d_2} - \frac{(\hat{y}-y_1)}{d_1} \\ \vdots & \vdots \\ \frac{(\hat{x}-x_M)}{d_M} - \frac{(\hat{x}-x_1)}{d_1} & \frac{(\hat{y}-y_M)}{d_M} - \frac{(\hat{y}-y_1)}{d_1} \\ \frac{\hat{x}-x_r}{\sqrt{(x_r-\hat{x})^2+(y_r-\hat{y})^2}} & \frac{\hat{y}-y_r}{\sqrt{(x_r-\hat{x})^2+(y_r-\hat{y})^2}} \end{bmatrix} \quad \text{(Eq. 12)}$$

and vector b as $$b = \begin{bmatrix} d_{12} - \left( \sqrt{(x_2-\hat{x})^2+(y_2-\hat{y})^2} - \sqrt{(x_1-\hat{x})^2+(y_1-\hat{y})^2} \right) \\ \vdots \\ d_{1M} - \left( \sqrt{(x_M-\hat{x})^2+(y_M-\hat{y})^2} - \sqrt{(x_1-\hat{x})^2+(y_1-\hat{y})^2} \right) \\ d - \sqrt{(x_r-\hat{x})^2+(y_r-\hat{y})^2} \end{bmatrix} \quad \text{(Eq. 13)}$$

where $(\hat{x}, \hat{y})$ is the estimate of the mobile receiver position at each iteration. The determined system of linear equations can be solved iteratively using:

$$\hat{C} = (A^T A)^{-1} A^T b. \quad \text{(Eq. 14)}$$

The approximation of the correction vector is now obtained and can be added to the position estimate to compute an updated position estimate before beginning the next iteration. When the distance between successive position estimates is sufficiently small (a limit determined by the user), the iterations have converged, providing a final position estimate.

The output of the least squares algorithm is an estimate of the mobile position in XY coordinates. Error is computed by calculating the Euclidean distance between this estimate and the true mobile station position, $$e = \sqrt{(x_m-x)^2 + (y_m-y)^2}, \quad \text{(Eq. 15)}$$

where e is error in meters, and $x_m$ and $y_m$ are the true mobile position coordinates. Alternatively, the estimated position may be transformed back into latitude/longitude values and the distance between estimated and true positions computed with the Vincenty formula. Both methods result in the same error values.

Figure 10:
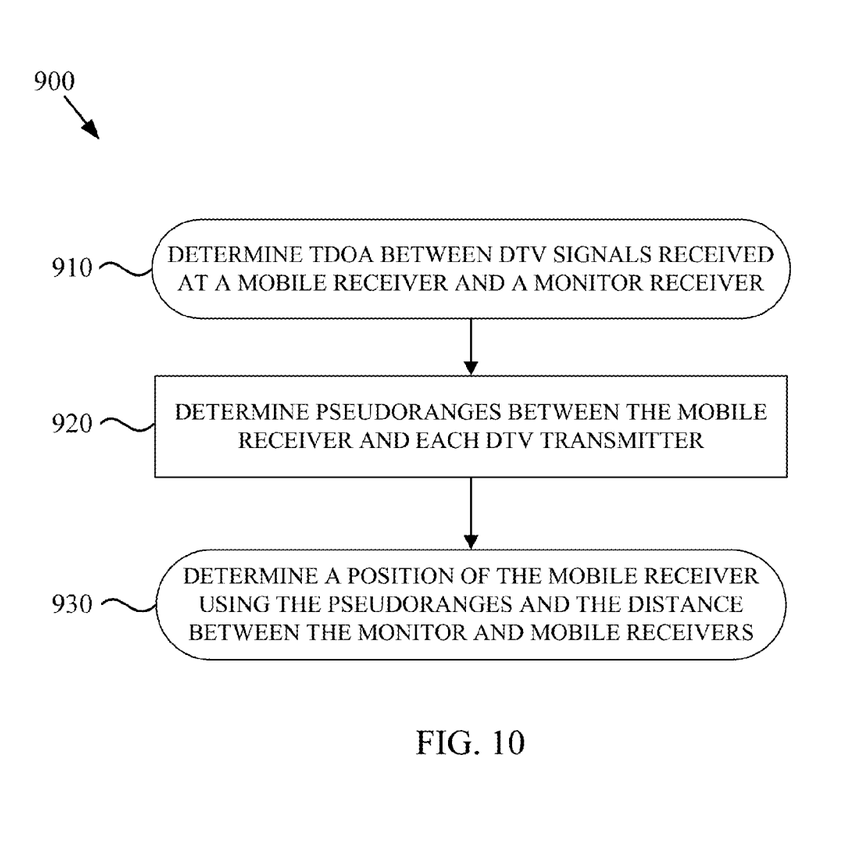
FIG. 10 shows a flowchart of an embodiment of a method in accordance with the Method for Hyperbolic Localization Using Broadcast Digital Television Signals and Monitor Receiver Ranging.

FIG. 10 shows a flowchart of an embodiment of a method 900 in accordance with the Method for Hyperbolic Localization Using Broadcast Digital Television Signals and Monitor Receiver Ranging. As an example, method 900 may be performed by a system such as system 500 shown in FIG. 5 and will be discussed with reference thereto. Also, while FIG. 10 shows one embodiment of method 900 to include steps 910-930, other embodiments of method 900 may contain fewer or more steps. Further, while in some embodiments the steps of method 900 may be performed as shown in FIG. 10, in other embodiments the steps may be performed in a different order, or certain steps may occur simultaneously with one or more other steps. Additionally, some or all of the steps of method 900 may be performed by a processor embedded within a receiver such as mobile receiver 520, or by other processing means directly or communicably connected to monitor receiver 510 and mobile receiver 520.

Method 900 begins at step 910, which involves determining a time difference of arrival (TDOA) between two robust DTV signals 502 and 504 received at a mobile receiver 520 and a monitor receiver 510 from at least two DTV transmitters, such as transmitters 40, 50, and 60 shown in FIG. 1 and transmitters 130 and 140 shown in FIG. 2. As used herein, a "robust signal" is a DTV signal that produces repeating peaks occurring every 24.2 ms when cross-correlated against the ATSC PN 511 sequence.

Step 920 involves determining a pseudorange between mobile receiver 520 and each of the DTV transmitters. Step 930 involves determining a position of mobile receiver 520 using the determined pseudoranges and the distance between monitor receiver 510 and mobile receiver 520. In some embodiments, DTV signals 502 and 504 are advanced television systems committee (ATSC) signals. In some embodiments, clocks of mobile receiver 520 and monitor receiver 510 are synchronized.

In some embodiments, method 900 further includes the step of determining a clock offset between mobile receiver 520 and monitor receiver 510. The clock offset and distance between monitor receiver 510 and mobile receiver 520 can be determined using two signals and four timestamps: Signal A is transmitted from the monitor receiver 510 to the mobile receiver 520 and Signal B is transmitted from the mobile receiver 520 to the monitor receiver 510. Timestamp T1 is the time of monitor receiver's 510 clock when Signal A is transmitted from the monitor receiver 510, Timestamp T2 is the time of mobile receiver's 520 clock when Signal A is received at the mobile receiver 520, Timestamp T3 is the time of mobile receiver's 520 clock when Signal B is transmitted from the mobile receiver 520, and Timestamp T4 is the time of monitor receiver's 510 clock when Signal B is received at the monitor receiver 510. Then, the clock offset θ is given by Equation 16 and the distance d between monitor receiver 510 and mobile receiver 520 is given by Equation 17.

$$\theta = 0.5((T_2-T_1)+(T_3-T_4)) \quad \text{(Eq. 16)}$$

$$d = 0.5((T_4-T_1)-(T_3-T_2)) \quad \text{(Eq. 17)}$$

In some embodiments, the step of determining a TDOA between the DTV signals comprises the steps of cross-correlating, using cross-correlation components 540 and 550, the received broadcast DTV signal, signals 502 and 504, with a pseudo-random noise (PN) sequence 560 of the broadcast DTV signal and using cross-correlation peak information to determine the TDOA, as discussed above with reference to FIG. 6 and FIG. 9. As an example in such embodiments, the DTV signals are ATSC signals and the PN sequence is an ATSC PN 511 sequence. The ATSC's PN-511 sequence was chosen as the vector to cross-correlate against, but other elements of the signal may be investigated for use as well, such as the pilot carrier or other signal symbols.

Also as discussed above, in some embodiments, the step of determining a pseudorange between mobile receiver 520 and each of the DTV transmitters comprises the steps of determining the location of each of the DTV transmitters, determining the distance between monitor receiver 510 and each of the DTV transmitters, determining, using the TDOA from TDOA calculation component 570, the difference in the distance between monitor receiver 510 and each of the DTV transmitters and mobile receiver 520 and each of the DTV transmitters, and for each DTV transmitter, summing the distance between monitor receiver 510 and the particular DTV transmitter and the difference in the distance between monitor receiver 510 and the particular DTV transmitter and mobile receiver 520 and the particular DTV transmitter. The summed distance for each DTV transmitter is the pseudorange between that particular DTV transmitter and mobile receiver 520.

In some embodiments, the distance between monitor receiver 510 and mobile receiver 520 is determined by using a round-trip time calculation of a signal sent between monitor receiver 510 and mobile receiver 520. In other embodiments, the distance between monitor receiver 510 and mobile receiver 520 is determined using a timing beacon broadcast from monitor receiver 510, which may also aid in synchronization.

In some embodiments, the step of determining a position of mobile receiver 520 comprises the steps of forming a system of non-linear equations representing two hyperbolic lines using the determined pseudoranges and the distance between monitor receiver 510 and mobile receiver 520, and solving the system of non-linear equations using a numerical algorithm, such as the least squares algorithm.

Some or all of the steps of method 900 may be stored on a non-transitory computer readable storage medium, wherein the steps are represented by computer readable programming code. The steps of method 900 may also be computer-implemented using a programmable device, such as a computer-based system. Method 900 may comprise instructions that, when loaded into a computer-based system, cause the system to execute the steps of method 900. Method 400 may be implemented using various programming languages, such as "Java", "C", or "C++".

Various storage media, such as magnetic computer disks, optical disks, and electronic memories, as well as computer readable media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself, and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

Many modifications and variations of the Method for Hyperbolic Localization Using Broadcast Digital Television Signals and Monitor Receiver Ranging are possible in light of the above description. Within the scope of the appended claims, the embodiments of the systems described herein may be practiced otherwise than as specifically described. The scope of the claims is not limited to the implementations and the embodiments disclosed herein, but extends to other implementations and embodiments as may be contemplated by those having ordinary skill in the art.

We claim:

1. A method comprising:
   determining a time difference of arrival (TDOA) between two robust digital television (DTV) signals received at a mobile receiver and a monitor receiver from at least two DTV transmitters;
   determining a pseudorange between the mobile receiver and each of the DTV transmitters; and
   determining a position of the mobile receiver using the determined pseudoranges and the distance between the monitor receiver and the mobile receiver.

2. The method of claim 1, wherein the DTV signals are advanced television systems committee (ATSC) signals.

3. The method of claim 1, wherein clocks of the mobile receiver and the monitor receiver are synchronized.

4. The method of claim 1 further comprising the step of determining a clock offset between the mobile receiver and the monitor receiver.

5. The method of claim 1, wherein the step of determining a TDOA between the DTV signals comprises the steps of:
   cross-correlating the received robust DTV signal with a pseudo-random noise (PN) sequence of the robust DTV signal; and
   using cross-correlation peak information to determine the TDOA.

6. The method of claim 5, wherein the DTV signals are ATSC signals and the PN sequence is an ATSC PN 511 sequence.

7. The method of claim 1, wherein the step of determining a pseudorange between the mobile receiver and each of the DTV transmitters comprises the steps of:
   determining the location of each of the DTV transmitters;
   determining the distance between the monitor receiver and each of the DTV transmitters;
   determining, using the TDOA, the difference in the distance between the monitor receiver and each of the DTV transmitters and the mobile receiver and each of the DTV transmitters; and
   for each DTV transmitter, summing the distance between the monitor receiver and the particular DTV transmitter and the difference in the distance between the monitor receiver and the particular DTV transmitter and the mobile receiver and the particular DTV transmitter, wherein the summed distance for each DTV transmitter is the pseudorange between that particular DTV transmitter and the mobile receiver.

8. The method of claim 1, wherein the distance between the monitor receiver and the mobile receiver is determined by using a round-trip time calculation of a signal between the monitor receiver and the mobile receiver.

9. The method of claim 1, wherein the distance between the monitor receiver and the mobile receiver is determined using a timing beacon broadcast from the monitor receiver.

10. The method of claim 1, wherein the step of determining a position of the mobile receiver comprises the steps of:
    forming a system of non-linear equations representing two hyperbolic lines using the determined pseudoranges and the distance between the monitor receiver and the mobile receiver; and
    solving the system of non-linear equations using a numerical algorithm.

11. A system comprising:
    a monitor receiver and a mobile receiver each configured to receive a robust DTV signal from at least two DTV transmitters; and
    a processing system communicably connected to each of the monitor receiver and the mobile receiver, the processing system configured to determine a time difference of arrival (TDOA) between the robust DTV signals received at the mobile receiver and the monitor receiver, determine a pseudorange between the mobile receiver and each of the DTV transmitters, and determine a position of the mobile receiver using the determined pseudoranges and the distance between the monitor receiver and the mobile receiver.

12. The system of claim 11, wherein clocks of the mobile receiver and the monitor receiver are synchronized.

13. The system of claim 11, wherein the processing system is further configured to perform the step of determining a clock offset between the mobile receiver and the monitor receiver prior to determining the TDOA.

14. The system of claim 11, wherein the processing system is configured to perform the step of determining a TDOA between the DTV signals by cross-correlating the received robust DTV signal with a pseudo-random noise (PN) sequence of the robust DTV signal and using cross-correlation peak information to determine the TDOA.

15. The system of claim 14, wherein the DTV signals are ATSC signals and the PN sequence is an ATSC PN 511 sequence.

16. The system of claim 11, wherein the processing system is configured to perform the step of determining a pseudorange between the mobile receiver and each of the DTV transmitters by determining the location of each of the DTV transmitters, determining the distance between the monitor receiver and each of the DTV transmitters, determining, using the TDOA, the difference in the distance between the monitor receiver and each of the DTV transmitters and the mobile receiver and each of the DTV transmitters, and for each DTV transmitter, summing the distance between the monitor receiver and the particular DTV transmitter and the difference in the distance between the monitor receiver and the particular DTV transmitter and the mobile receiver and the particular DTV transmitter, wherein the summed distance for each DTV transmitter is the pseudorange between that particular DTV transmitter and the mobile receiver.

17. The system of claim 11, wherein the distance between the monitor receiver and the mobile receiver is determined by the processing system using a round-trip time calculation of a signal between the monitor receiver and the mobile receiver.

18. The system of claim 11, wherein the processing system is configured to determine the distance between the monitor receiver and the mobile receiver using a timing beacon broadcast from the monitor receiver.

19. The system of claim 11, wherein the processing system is configured to determine the position of the mobile receiver by forming a system of non-linear equations representing two hyperbolic lines using the determined pseudoranges and the distance between the monitor receiver and the mobile receiver, and using a numerical algorithm to solve the system of non-linear equations.

20. A non-transitory computer-readable storage medium having a method, represented by computer-readable programming code, stored therein, the method comprising the steps of:
  determining a time difference of arrival (TDOA) between two robust digital television (DTV) signals received at a mobile receiver and a monitor receiver from at least two DTV transmitters;
  determining a pseudorange between the mobile receiver and each of the DTV transmitters; and
  determining a position of the mobile receiver using the determined pseudoranges and the distance between the monitor receiver and the mobile receiver.

* * * * *